US009822266B2

(12) United States Patent
Okamoto et al.

(10) Patent No.: US 9,822,266 B2
(45) Date of Patent: Nov. 21, 2017

(54) NEAR INFRARED-REFLECTING/TRANSMITTING AZO PIGMENT, METHOD FOR MANUFACTURING NEAR INFRARED-REFLECTING/TRANSMITTING AZO PIGMENT, COLORANT COMPOSITION USING SAID AZO PIGMENTS, ITEM-COLORING METHOD AND COLORED ITEM

(71) Applicant: DAINICHISEIKA COLOR & CHEMICALS MFG. CO., LTD., Tokyo (JP)

(72) Inventors: Hisao Okamoto, Tokyo (JP); Hideki Ito, Tokyo (JP); Hiromitsu Yanagimoto, Tokyo (JP)

(73) Assignee: DAINICHISEIKA COLOR & CHEMICALS MFG. CO., LTD., Tokyo (JP)

( * ) Notice: Subject to any disclaimer, the term of this patent is extended or adjusted under 35 U.S.C. 154(b) by 0 days.

(21) Appl. No.: 15/110,056

(22) PCT Filed: Feb. 19, 2014

(86) PCT No.: PCT/JP2014/053856
§ 371 (c)(1),
(2) Date: Jul. 6, 2016

(87) PCT Pub. No.: WO2015/125224
PCT Pub. Date: Aug. 27, 2015

(65) Prior Publication Data
US 2016/0333202 A1 Nov. 17, 2016

(51) Int. Cl.
| | |
|---|---|
| C09D 5/32 | (2006.01) |
| C09D 11/037 | (2014.01) |
| C09D 11/322 | (2014.01) |
| C09B 27/00 | (2006.01) |
| C09B 56/02 | (2006.01) |
| C09D 5/33 | (2006.01) |

(52) U.S. Cl.
CPC ............ C09D 11/037 (2013.01); C09B 56/02 (2013.01); C09D 5/004 (2013.01); C09D 5/32 (2013.01); C09D 11/322 (2013.01)

(58) Field of Classification Search
CPC ...... C09D 5/32; C09D 11/037; C09D 11/322; C09B 27/00; C09B 56/02
USPC ......... 106/31.6, 31.67, 31.75, 310, 311, 496, 106/499, 503, 504, 493, 494, 495; 252/587; 524/90, 168, 190
See application file for complete search history.

(56) References Cited

U.S. PATENT DOCUMENTS

| | | | | |
|---|---|---|---|---|
| 4,221,709 A | * | 9/1980 | Kawamura | ......... C09B 29/0003 534/551 |
| 4,869,532 A | | 9/1989 | Abe et al. | |
| 2002/0121228 A1 | * | 9/2002 | Zama | .................. C09B 29/0011 106/496 |

FOREIGN PATENT DOCUMENTS

| | | |
|---|---|---|
| CH | 643870 | 6/1984 |
| EP | 0263442 | 4/1988 |
| JP | 5430221 | 3/1979 |
| JP | 54141821 | 11/1979 |
| JP | 5649757 | 5/1981 |
| JP | 56109257 | 8/1981 |
| JP | 63-091283 | 4/1988 |
| JP | 2-229281 | 9/1990 |
| JP | 2002256165 | 9/2002 |

OTHER PUBLICATIONS

International Search Report, issued in the corresponding International Application No. PCT/JP2014/053856, dated Apr. 22, 2014, 4 pages.
Partial European Search Report, issued in the corresponding European patent application No. 14883211.6, dated Sep. 25, 2017, 17 pages.

* cited by examiner

*Primary Examiner* — Bijan Ahvazi
(74) *Attorney, Agent, or Firm* — Hamre, Schumann, Mueller & Larson, P.C.

(57) ABSTRACT

An azo pigment is provided which can be used as a coloring agent, etc. for use in paints, plastics, synthetic fibers, printing inks, and writing materials or for image recording or image displaying and which has performance of exhibiting high near infrared reflection/transparency, particularly when used as a heat-shielding paint, even in the case where the pigment has a dark color, and as a result, colored articles having the above-described properties are provided, and furthermore an article that is also useful as a printing ink in the security field is provided particularly when the pigment has a dark or black color. Specifically, an azo pigment is provided which is obtained through coupling reaction between a particular azo component and a particular coupling component, which has a plurality of chromophores of an azomethine group and of an azo group within a molecule, and in which the diazo component is a diazotized product of 3-(4-aminophenylimino)-1-oxo-4,5,6,7-tetrachroloisoindoline.

10 Claims, No Drawings

NEAR INFRARED-REFLECTING/TRANSMITTING AZO PIGMENT, METHOD FOR MANUFACTURING NEAR INFRARED-REFLECTING/TRANSMITTING AZO PIGMENT, COLORANT COMPOSITION USING SAID AZO PIGMENTS, ITEM-COLORING METHOD AND COLORED ITEM

TECHNICAL FIELD

The present invention relates to a near infrared-reflecting/transmitting azo pigment (coloring matter), a process for producing a near infrared-reflecting/transmitting azo pigment, a coloring agent composition using the azo pigment, and a coloring method and a colored article each using the coloring agent composition. In more detail, the present invention relates to an azo pigment being different from an ordinary azo pigment and obtained by conducting diazotization reaction and coupling reaction in an organic solvent, a process for producing the azo pigment, and a coloring agent, a coloring method, and a colored article each using the azo pigment.

BACKGROUND ART

Conventionally, in the case where exteriors such as roofs and exterior walls of a building are coated with a coating film, dark-color paints have often been used in order to make dirt or the like obscure because the exteriors are easy to become dirty and are easy to observe. Pigments for use in the dark-color paints are generally carbon blacks and iron oxide blacks. However, these pigments absorb light having a wavelength ranging from an ultraviolet region to a far infrared region and therefore is easy to absorb heat rays, namely infrared rays, and thus there is a problem in these pigments that the indoor temperature of a building or car is easy to increase due to direct sunlight.

On the other hand, solar heat-reflecting paints containing a white pigment such as titanium oxide are known as paints for preventing the indoor temperature of a building from increasing, however these paints are white or light color paints and therefore are unsuitable for exteriors in many cases because dirt or the like thereon is conspicuous. Moreover, clear chromaticity is desired depending on the use application in some cases, and therefore a material for solar heat-reflecting paints or heat-reflecting paints, the material having a clear chromaticity, a dark chromatic color, or black color and having a sufficient heat-reflecting property, namely a pigment that can realize the properties has been required.

Heat-reflecting enamel in which a light-resistant vehicle, a pigment, and an extender pigment are combined, the heat-reflecting enamel useful as a heat-shielding paint for an airplane is disclosed in Patent Literature 1, and use of a titanium white-based or zinc oxide-based pigment as a white pigment, an iron oxide-based pigment or a quinacridone-based pigment as a red pigment, an iron oxide-based pigment, an iron hydroxide-based pigment, chromic acid-based pigment, or an azo-based pigment as a yellow pigment, a phthalocyanine blue-based or complex oxide-based pigment as a blue pigment, and a chrome green-based or phthalocyanine green-based pigment as a green pigment is proposed in the representative examples. However, the enamel is not preferable in terms of environmental hygiene in that the enamel contains a heavy metal such as chromium, and a solar heat-reflecting paint not using a heavy metal and having a sufficient heat-reflecting property has been awaited.

Moreover, as a new technological problem in recent years, there is an increasing number of fields seeking functional pigments having an optical property that has never been existed in generally-used conventional pigments as the progress in lasers, particularly in semiconductor lasers, and the progress of sensors thereto are made, and the development of a pigment that is applicable to these requirements is in need. In printing ink fields for example, an infrared-reflecting/transmitting pigment is required which has a function by which an ink containing an infrared-reflecting/transmitting pigment is printed and thereafter information that is unidentifiable with the naked eye can be read with an infrared reader or the like, and which can also be used effectively for printing or the like in the security fields, such as hidden bar codes, hidden two-dimensional codes, and forgery prevention of valuable papers, passports, various kinds of expert opinions in writing, and so on.

CITATION LIST

Patent Literature

Patent Literature 1: Japanese Patent Laid-Open No. 56-109257

SUMMARY OF INVENTION

Technical Problem

The present invention has been made in consideration of the circumstances, and the main object of the present invention is to provide various kinds of articles: that can be used as a coloring agent or the like for use in paints, plastics, synthetic fibers, printing inks, or writing materials, or as a coloring agent for image recording or image displaying; that are particularly useful also as a heat-shielding paint for exteriors such as roofs and exterior walls of a building; and that exhibit an excellent near infrared-reflecting/transmitting property even when the coloring agent composition is used for dark-color articles intended to make dirt obscure. Furthermore, another object of the present invention is to make it possible to provide an article that is useful also as a printing ink in the security fields as described previously especially when a pigment exhibiting dark color or black color is used.

Solution to Problem

The objects are achieved by the constitution of the present invention described below. That is to say, the present invention provides a near infrared-reflecting/transmitting azo pigment exhibiting a near infrared-reflecting/transmitting property, the azo pigment having a single maximum reflectance wavelength in a wavelength region from 600 to 900 nm in a reflectance spectrum measured on a black substrate in a wavelength region from 500 to 1500 nm, wherein a diazonium compound of a compound represented by the following formula (1) is used as a diazo component, and the azo pigment is obtained by coupling the diazo component with any one of coupling components selected from the group consisting of compounds represented by the following formulas (2), (3), and (4).

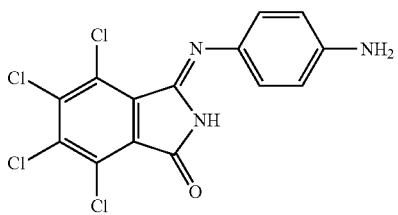

(1)

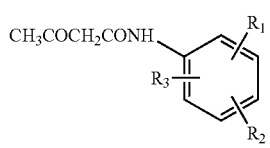

(2)

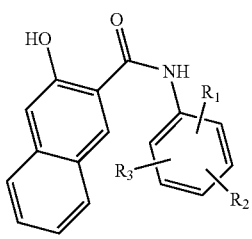

(3)

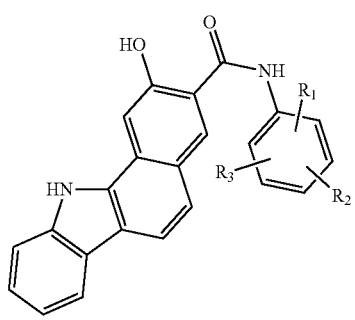

(4)

[wherein $R_1$ to $R_3$ in the formulas (2) to (4) each independently represent any one of a hydrogen atom, a halogen atom, a methyl group, a methoxy group, an ethoxy group, and an acetylamino group.]

Preferred embodiments of the near infrared-reflecting/transmitting azo pigment include the near infrared-reflecting/transmitting azo pigment, wherein an L* value in a CIE LAB (L*a*b*) color system is 10 or more when color measurement of a paint applied on white paper with a 10-mill applicator, the paint prepared by adding the azo pigment so as to be 10 parts by mass to 100 parts by mass of a solid content of a melamine alkyd resin and dispersing the azo pigment is conducted with a spectrophotometer. The solid content of the melamine alkyd resin here means the content of the resin left after solvents contained in a melamine alkyd resin varnish used as a material for forming the paint, such as, for example, aromatic solvents the example of which includes xylene, aliphatic solvents the example of which includes 1-butanol, and diluents the example of which includes a thinner, are removed.

The present invention provides a process for producing a near infrared-reflecting/transmitting azo pigment described below as another embodiment. That is to say, the present invention provides a process for producing the near infrared-reflecting/transmitting azo pigment, the process including: a step of dispersing 3-(4-aminophenylimino)-1-oxo-4,5,6,7-tetrachloroisoindoline represented by the following formula (1) in an organic solvent having a boiling point of 120° C. or higher, then preparing a hydrochloric acid salt with concentrated hydrochloric acid, and diazotizing the hydrochloric acid salt with a nitrite dissolved in water to prepare a diazonium salt, thereby preparing a diazo component; a step of using any one selected from the group consisting of compounds represented by the following formulas (2), (3), and (4) as a coupling component, and dropping a solution of the diazonium salt prepared in the above step into an organic solvent solution obtained by dispersing the coupling component in an organic solvent having a boiling point of 120° C. or higher to conduct coupling reaction, thereby synthesizing an azo pigment; and a step of subsequently heating the organic solvent containing the synthesized azo pigment at a temperature of 120° C. to 200° C. while distilling (removing) a component (liquid) having a boiling point of 120° C. or lower from the organic solvent containing the synthesized azo pigment, thereby subjecting the azo pigment to pigmentation (crystallizing) the azo pigment in the organic solvent having a boiling point of 120° C. or higher.

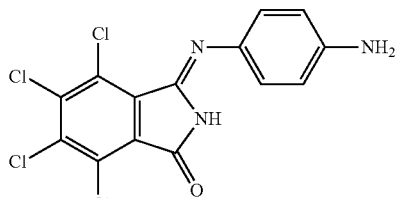

(1)

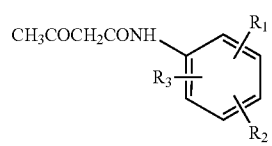

(2)

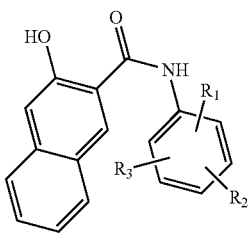

(3)

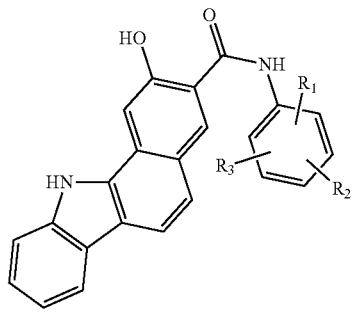

(4)

[wherein $R_1$ to $R_3$ in the formulas (2) to (4) each independently represent any one of a hydrogen atom, a halogen atom, a methyl group, a methoxy group, an ethoxy group, and an acetylamino group.]

Preferred embodiments of the process for producing the near infrared-reflecting/transmitting azo pigment include the process for producing the infrared-reflecting/transmitting azo pigment, wherein at least any one selected from the group consisting of chlorobenzene, o-dichlorobenzene, ethyl cellosolve, butyl cellosolve, nitrobenzene, o-nitrotoluene, N—N-dimethylformamide, N—N-dimethylacetamide, N-methyl-2-pyrrolidone, and 1,3-dimethyl-2-imidazolidinone is used as the organic solvent having a boiling point of 120° C. or higher.

The present invention provides, as yet another embodiment, a coloring agent composition in a liquid or solid form, containing a pigment component in a liquid dispersion medium or in a solid dispersion medium, wherein the pigment component is any one of the near infrared-reflecting/transmitting azo pigments, or the pigment component is any one of the near infrared-reflecting/transmitting azo pigments obtained by the production processes.

Moreover, preferred embodiments of the coloring agent composition include the following embodiments. That is to say, the liquid dispersion medium contains a film-forming component, the film-forming component is at least one selected from the group consisting of polymers that may have a reactive group, oligomers that may have a reactive group, and monomers that may have a reactive group, and the film-forming component itself is in a liquid form or the film-forming component contains a solvent and/or water to be in a liquid form; the solid dispersion medium is a dispersion medium in a solid form, containing at least one solid dispersion medium selected from the group consisting of solid dispersion media made of a thermoplastic resin, solid dispersion media made of a thermosetting resin, waxes, fatty acid amides, and metal soaps of a fatty acid; and the coloring agent composition is for use in any one of paints, plastics, synthetic fibers, printing inks, and writing materials, or the coloring agent composition is for coloration in image recording or image displaying.

Further, the present invention provides, as still another embodiment, a coloring method for coloring an article having a transparent base material using the coloring agent composition, wherein a surface of the transparent base material is colored using the coloring agent composition by any one of methods selected from the group consisting of painting, application, dying, printing, writing, drawing, inkjet printing, electrophotographic printing, and electrostatic printing or an inside of the article is colored by a method of kneading the coloring agent composition with a material for forming the coloring agent composition or impregnating the coloring agent composition into a material for forming the coloring agent composition.

Furthermore, the present invention provides, as still yet another embodiment, a colored article colored by the method for coloring an article.

Advantageous Effects of Invention

According to the present invention, a novel azo pigment that absorbs light in a visible region and has a particular chemical structure exhibiting a near infrared-reflecting/transmitting property that greatly contributes to heat is provided.

More specifically, the azo pigment provided by the present invention is useful as a coloring agent or the like that is applicable to various use applications such as paints, plastics, synthetic fibers, printing inks, writing materials, image recording, and image displaying, and especially articles obtained by applying the azo pigment as a heat-shielding paint (infrared-reflecting paint) on the surface thereof or shaped products which are made of a plastic and the inside of which is colored by kneading or impregnating the azo pigment with or in a material for forming the articles become articles or shaped products which are hard to have a high temperature and which can exhibit an excellent heat-shielding effect even when exposed to direct sunlight.

Moreover, in the case where the azo pigment according to the present invention exhibits dark color or black color, formation of an image that can be read with an infrared reader is made possible and infrared information that is unidentifiable with the naked eye can be formed by preparing an infrared-reflecting ink or an image-recording ink using the azo pigment and printing the ink. Thus, by using the azo pigment according to the present invention as a coloring agent for inks or the like, various kinds of printed matter in the fields where security is regarded as important, such as hidden barcodes, hidden two-dimensional codes, and forgery prevention of valuable papers, passports, various kinds of expert opinions in writing, and so on, can be provided.

DESCRIPTION OF EMBODIMENTS

Next, the present invention will be described in more detail giving the best embodiment according to the present invention. The near infrared-reflecting/transmitting azo pigment according to the present invention is an azo pigment obtained through coupling reaction between a diazo component and a coupling component and having a plurality of chromophores, an azomethine group and an azo group, in the molecule, and each of the azo component and the coupling component are particular components. Specifically, the diazo component is a diazonium compound obtained by diazotizing 3-(4-aminophenylimino)-1-oxo-4,5,6,7-tetrachloroisoindoline represented by the formula (1), and, further, at least one of the coupling components is any one of compounds selected from the group consisting of compounds having a 3-oxobutane amide residue and represented by the formula (2), compounds having a 3-hydroxy-2-naphthoic acid anilide residue and represented by the formula (3), and compounds having a 2-hydroxy-11H-benzo[a]carbozole-3-carbamide residue and represented by the formula (4).

[Near Infrared-Reflecting/Transmitting Azo Pigment]

As described above, the azo pigment according to the present invention is obtained by coupling the diazonium compound represented by the following formula (1) with a coupling component selected from the group consisting of the compounds represented by the following formulas (2), (3), and (4), and further, as the optical properties, absorbs light in a visible region and has a single maximum reflectance wavelength in a wavelength region from 600 to 900 nm in a reflectance spectrum measured on a black substrate in a wavelength region from 500 to 1500 nm. The "azo pigment" in the present invention means a pigment having a plurality of chromophores, an azomethine group and an azo group, in the molecule.

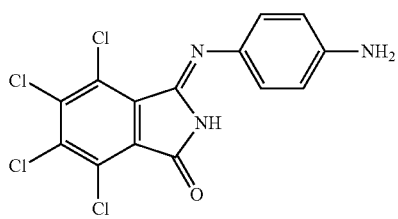

(1)

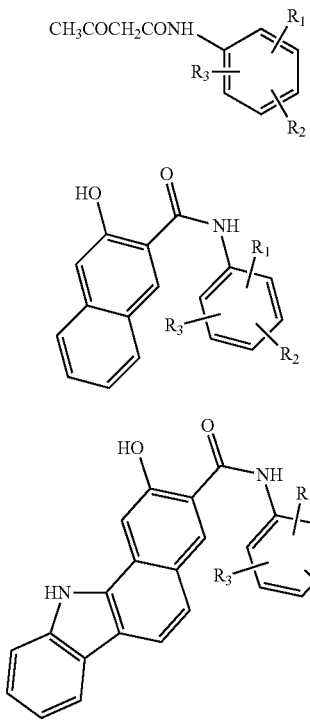

[wherein, $R_1$ to $R_3$ in the formulas (2) to (4) each independently represent anyone of a hydrogen atom, a halogen atom, a methyl group, a methoxy group, an ethoxy group, and an acetylamino group.]

The present inventors have conducted diligent studies in order to develop a characteristic azo pigment that absorbs light in a visible light region and reflects and transmits light from a visible light region to a near infrared region. In conducting the studies, the present inventors have studied on a pigment containing a plurality of chromophores mutually in a resonance state in the molecule and have found that the pigment is more preferable in the case where an L* value in a CIE LAB (L*a*b*) color system is 10 or more when color measurement of a paint applied on white paper with a 10-mill applicator, the paint prepared by adding the azo pigment so as to be 10 parts by mass to 100 parts by mass of a solid content of a melamine alkyd resin and dispersing the azo pigment is conducted with a spectrophotometer.

[Process for Producing Near Infrared-Reflecting/Transmitting Azo Pigment]

Hereinafter, the process for producing an azo pigment having a particular chemical structure according to the present invention will be described. As described previously, the present inventors have found that a pigment becomes excellent in functionality when the pigment is, as a pigment that reflects and transmits light from a visible light region to a near infrared region, a compound having a plurality of chromophores, an azomethine group and an azo group, the diazo component used for the coupling reaction in synthesizing the pigment is the above-described diazonium compound obtained by diazotizing 3-(4-aminophenylimino)-1-oxo-4,5,6,7-tetrachloroisoindoline represented by the formula (1), and at least one of coupling components is a compound selected from the group consisting of compounds having a 3-oxobutane amide residue, compounds having a 3-hydroxy-2-naphthalene carbamide residue, and compounds having a 2-hydroxy-11H-benzo[a]carbazole-3-carbamide residue.

The diazo component used in producing the pigment according to the present invention is a diazonium compound of 3-(4-aminophenylimino)-1-oxo-4,5,6,7-tetrachloroisoindoline represented by the formula (1), and the diazo component is a publicly known compound that is disclosed in, for example, Japanese Patent Publication No. 49-24561. The compound represented by the following formula (1) is advantageously obtained according to a publicly known method from 3-imino-1-oxoisoindoline or 3,3'-dichloro-1-oxoisoindoline, and p-phenylenediamine.

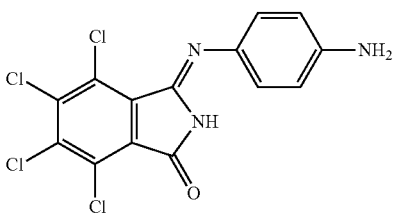

The coupling component used in producing the azo pigment according to the present invention is any one of the compounds selected from the group consisting of compounds having a 3-oxobutane amide residue and represented by the following formula (2), compounds having a 3-hydroxy-2-naphthoic acid anilide residue and represented by the following formula (3), and compounds having a 2-hydroxy-11H-benzo[a]-carbozole-3 carbamide residue and represented by the following formula (4). Such compounds are universally known as coupling components for azo dyes and pigments.

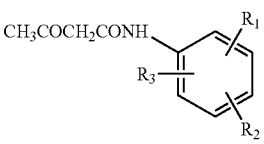

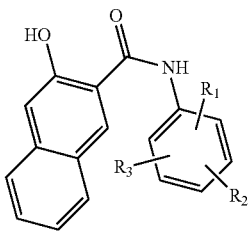

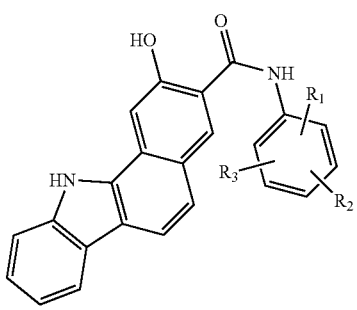

[wherein, $R_1$ to $R_3$ in the formulas (2) to (4) each independently represent anyone of a hydrogen atom, a halogen atom, a methyl group, a methoxy group, an ethoxy group, and an acetylamino group.]

Examples of the compound having a 3-oxobutane amide residue and represented by the formula (2) include acetoacetanilide, 2'-methylacetoacetanilide, 4'-methylacetoacetanilide, 2'-methoxyacetoacetanilide, 4'-methoxyacetoacetanilide, 2'-chloroacetoacetanilide, 4'-chloro-2',5'-dimethoxyacetoacetanilide, 4'-acetylaminoacetoacetanilide, 2',4'-dimethylacetoacetanilide, 2',4'-dimethoxyacetoacetanilide, 2',5'-dimethoxyacetoacetanilide, 5'-chloro-2'-methoxyacetoacetanilide, and 4'-chloro-2',5'-dimethoxyacetoacetanilide.

Examples of the compound having a 3-hydroxy-2-naphthoic acid anilide residue and represented by the formula (3) include N-phenyl-3-hydroxy-2-naphthoic acid anilide, 3-hydroxy-2'-methoxy-2-naphthoic acid anilide, 3-hydroxy-4'-methoxy-2-naphthoic acid anilide, 2'-ethoxy-3-hydroxy-2-naphthoic acid anilide, 5'-chloro-3-hydroxy-2'-methyl-2-naphthoic acid anilide, 5'-chloro-2',4'-dimethoxy-3-hydroxy-2-naphthoic acid anilide, 4'-chloro-2',5'-dimethoxy-3-hydroxy-2-naphthoic acid anilide, and 5'-chloro-3-hydroxy-2'-methoxy-2-naphthoic acid anilide.

Examples of the compound having a 2-hydroxy-11H-benzo[a]carbazole-3-carbamide residue and represented by the formula (4) include N-(2-methyl-4-methoxyphenyl)-2-hydroxy-11H-benzo[a]carbazole-3-carbamide and N-(4-methoxyphenyl)-2-hydroxy-11H-benzo[a]carbazole-3-carbamide.

In the present invention, the diazonium compound obtained by diazotizing, in the manner as will be described below, the compound produced by the method as described previously and represented by the formula (1) is used as the diazo component, and the diazo component is coupled with the above-described coupling component to obtain an azo pigment having a distinctive structure. First of all, the compound represented by the formula (1) is dispersed in an organic solvent having a boiling point of 120° C. or higher (part of the compound is dissolved depending on the kind of the solvent), then a hydrochloric acid salt of the compound is prepared with concentrated hydrochloric acid, and the hydrochloric acid salt is diazotized with a nitrite dissolved in water to produce a diazonium salt. Subsequently, a coupling component selected from the group consisting of the compounds represented by the formulas (2), (3), and (4) is dispersed in an organic solvent having a boiling point of 120° C. or higher to obtain an organic solvent solution, and coupling reaction is conducted by dropping the solution of the diazonium salt prepared in the manner as described previously into the organic solvent solution to produce an azo pigment. Subsequently, the organic solvent containing the synthesized azo pigment is heated at a temperature of 120° C. to 200° C. while distilling (removing) a component (liquid) having a boiling point of 120° C. or lower from the organic solvent containing the synthesized azo pigment, thereby subjecting the azo pigment to pigmentation (crystallizing) the azo pigment in the organic solvent having a boiling point of 120° C. or higher, and in this way, the near infrared-reflecting/transmitting azo pigment that is specified according to the present invention and is excellent in functionality can be produced.

As described above, it is preferable that the coupling reaction using the diazonium compound obtained by diazotizing the compound represented by the formula (1) and a particular coupling component (a series of these steps is sometimes referred to as "diazotization/coupling reaction") is conducted in the organic solvent having a boiling point of 120° C. or higher. Examples of the organic solvent that has a boiling point of 120° C. or higher and can be used in the coupling reaction include chlorobenzene, o-dichlorobenzene, ethyl cellosolve, butyl cellosolve, nitrobenzene, o-nitrotoluene, N,N-dimethylformamide, N,N-dimethylacetamide, N-methyl-2-pyrrolidone, and 1,3-dimethyl-2 imidazolidinone. These organic solvents can be used alone or in combination of two or more.

As described above, the diazotization/coupling reaction is conducted in the organic solvent having a boiling point of 120° C. or higher in the process for producing an azo pigment according to the present invention, and by constituting the diazotization/coupling reaction as such, pigmentation (crystallization) after the diazotization/coupling reaction subsequent to the coupling reaction can smoothly be conducted. The purpose of finally subjecting the azo pigment to pigmentation (crystallizing) a pigment here in the method for producing an azo pigment according to the present invention is as follows. As will be described later, the diazotization/coupling reaction is conducted at a relatively low temperature (0° C. to 50° C.), and therefore it is general that the primary particle of the pigment is fine and is not well-controlled and the crystal form is relatively close to amorphous. Thus, when a pigment that is excellent in solvent resistance is produced, it is effective to simultaneously grow particles and control the particle size by heating the pigment in an organic solvent. The temperature of forming the pigment in this case is different depending on the solvent used and on the kind of the pigment, however it is preferable that the pigment formation is conducted at a temperature of 120° C. to 200° C. according to the studies by the present inventors. Thus, it is specified in the method for producing an azo pigment according to the present invention that the diazotization/coupling reaction is conducted in an organic solvent having a boiling point of 120° C. or higher.

[Coloring Agent Composition]

The azo pigment according to the present invention, when contained in a liquid dispersion medium or a solid dispersion medium, makes it possible to prepare a coloring agent composition that is applicable to a variety of use applications as a coloring agent. With respect to the constitution except using the azo pigment according to the present invention, the constitution of the coloring agent composition according to the present invention may be made to be most suitable according to the coloring purpose, the use application, and the usage. Specifically, the coloring agent composition according to the present invention may be used as a coloring agent composition in a liquid form, wherein a pigment component containing the azo pigment according to the present invention is contained in a liquid dispersion medium or as a coloring agent composition in a solid form, wherein the pigment component containing the azo pigment according to the present invention is contained in a solid dispersion medium. As the pigment component containing the azo pigment in the case where such a coloring agent composition according to the present invention is prepared, the azo pigment according to the present invention may be used alone, or one or two or more other pigments such as color pigments, white pigments, black pigments, and extender pigments may be selected and used according to the intended color.

[Other Pigments]

Other pigments that can be used, together with the above-described azo pigment according to the present invention, as a constituent of the coloring agent composition according to the present invention will be described. As the pigment to be used together with the azo pigment, publicly known pigments can be used. For example, at least one pigment selected from organic pigments such as anthraquinonebased pigments, quinacridone-based pigments, diketopyrrolopyrrole-based pigments, indigo/thioindigo-based pigments, perinone-based pigments, perylene-based pigments, phthalocyanine-based pigments, indoline-based pigments, isoindoline-based pigments, isoindolinone-based pigments, dioxazine-based pigments, quinophthalone-based pigments, nickel azo pigments, metal complex pigments, insoluble azo-based pigments, soluble azo-based pigments, high molecular weight azo-based pigments, azomethine azo-based black pigments, and aniline black-based pigments, and inorganic pigments such as carbon black pigments, complex oxide-based pigments, iron oxide pigments, titanium oxide-based pigments, or a mixture or a mixed crystal pigment of two or more of these pigments can be used.

More specific examples of the organic pigment include the following pigments. Examples of a yellow pigment include C.I. Pigment Yellow (hereinafter, abbreviated as PY) 74, PY 83, PY 93, PY 94, PY 95, PY 97, PY 109, PY 110, PY 120, PY 128, PY 138, PY 139, PY 147, PY 150, PY 151, PY154, PY 155, PY 166, PY 175, PY 180, PY 181, PY 185, and PY 191. Examples of an orange pigment include C.I. Pigment Orange (hereinafter, abbreviated as PO) 61, PO 64, PO 71, and PO 73. Examples of a red pigment include C.I. Pigment Red (hereinafter, abbreviated as PR)4, PR 5, PR 23, PR 48:2, PR 48:4, PR 57:1, PR 112, PR 122, PR 144, PR 146, PR 147, PR 150, PR 166, PR 170, PR 177, PR 184, PR 185, PR 202, PR 207, PR 214, PR 220, PR 221, PR 242, PR 254, PR 255, PR 264, and PR 272.

Examples of a blue pigment include C.I. Pigment Blue (hereinafter, abbreviated as PB) 15:1, PB 15:2, PB 15:3, PB 15:4, PB 15:5, PB 15:6, PB 16, PB 17:1, PB 60, PB 80, and aluminum phthalocyanine blue. Examples of a green pigment include C.I. Pigment Green (hereinafter, abbreviated as PG) 7, PG 36, PG 58, and Poly (13-16) bromophthalocyanine, and examples of a violet pigment include C.I. Pigment Violet (hereinafter, abbreviated as PV) 19, PV 23, and PV 37. Examples of a black pigment include aniline black pigments, carbon black pigments, and titanium oxide black pigments.

(Coloring Agent Composition in Liquid Form)

Hereinafter, the coloring agent composition in a liquid form, wherein a pigment component containing the azo pigment according to the present invention is dispersed in a liquid dispersion medium will be described. The coloring agent composition in a liquid form is mainly used as a coloring agent which is applied on the surface of an article, which is impregnated in the surface of an article, which is drawn or printed on the surface of an article, and can be used for various use applications such as paints, coloration of plastics, coloration of fibers, printing inks, writing materials, image recording, and image displaying. The liquid dispersion medium used in these cases contains at least one film-forming material selected from polymers that may have a reactive group, oligomers that may have a reactive group, and monomers that may have a reactive group, and the liquid dispersion medium wherein the film-forming material itself is in a liquid-form or the liquid dispersion medium wherein the film-forming material further contains a solvent and/or water to be in a liquid form can be used.

Furthermore, in obtaining the coloring agent composition in a liquid form, a high-concentration processed pigment product obtained by finely dispersing the pigment to be used in a liquid dispersion medium is prepared in advance and the processed product is used as a coloring agent, thereby making it possible to make the production of a coloring agent composition for various use applications easy. The high-concentration pigment dispersion liquid being the high-concentration processed pigment product in a liquid form is called as a "base color" or a "base ink" and is widely used for general purposes.

(Coloring Agent Composition in Solid Form)

Hereinafter, the coloring agent composition in a solid form, wherein a pigment component containing the azo pigment according to the present invention is dispersed in a solid dispersion medium will be described. The coloring agent composition in a solid form is mainly utilized as a coloring agent for plastics and as a coloring agent for use in coloration of the inside of synthetic fibers. In this case, the coloring agent composition is provided as publicly known product forms, such as a master powder and a master batch being a high-concentration processed pigment product (high-concentration pigment dispersion product) obtained by finely dispersing the azo pigment according to the present invention in high-concentration in advance, and a colored pellet in which coloration is conducted over the whole article. As the solid dispersion medium to be used in preparing the high-concentration processed pigment product, a solid dispersion medium containing at least one solid dispersion medium selected from the group consisting of: solid dispersion media made of a thermoplastic resin; solid dispersion media made of a thermosetting resin; waxes; fatty acid amides; and metal soaps of a fatty acid can be used.

[Coloring Method for Coloring Article Using Coloring Agent Composition]

A product to be obtained by coloring an article using a coloring agent composition in a liquid or solid form obtained by using the azo pigment according to the present invention as described above becomes a product in which an appropriate coloration is conducted according to the optical requirement (purpose) in a visible light region and an infrared region. For example, in the case where coloration by which light in a visible light region is comprehensively absorbed and light in an infrared region is transmitted is conducted, an article may be formed with a transparent base material, and then surface coloration may be conducted on the transparent base material by painting, application, dying, printing, writing, drawing, inkjet printing, electrophotographic printing, or electrostatic printing using the coloring agent composition in a liquid form, or inside coloration may be conducted by kneading or impregnating the coloring agent composition according to the present invention with or in a material for forming the article.

Moreover, on the other hand, in the case where coloration that allows an article to absorb light in a visible light region and reflect light in an infrared region is conducted, the article to be colored having a light-reflecting property in itself may be used or a light-reflecting substrate formed on the article in advance may be used, and coloration by application may be conducted using the coloring agent composition according to the present invention, thereby achieving the purpose of the coloration. As the coloring method, publicly known methods such as, for example, painting, application, coloring by an undiluted solution, textile printing, dip dying, printing, writing, drawing, inkjet printing, electrographic printing, electrostatic printing, and so on may be utilized.

In the case where coloration is conducted to an article by the surface coloration or inside coloration as described above utilizing the azo pigment according to the present invention, various kinds of resin binders as listed below can be used as a film-forming material. As the resin binder (also referred to "vehicle" or "varnish" depending on the use application) to be used as a film (coating film)-forming material, ordinary temperature drying type non-reactive resin binders not having a reactive group, or baking finish type resin binders having a reactive group can be used. Examples of the ordinary temperature drying type or baking finish type resin binder include resin binders used for textile printing materials, paints, and image recording materials such as printing inks, writing materials, inkjet printing, electrophotographic printing, and electrophotographic printing. Moreover, examples of a photosensitive resin binder include photosensitive resin binders for use in coating agents, printing inks, inkjet inks, and various kinds of ultraviolet ray-curable or electron beam-curable paints.

Specific examples of the ordinary temperature drying type resin binder or the baking finish type resin binder include: synthetic rubber resins; acrylic resins; styrene-based (co) polymers; vinyl resins such as polyvinyl butyral-based resins; polyester-based resins; amino resin-modified polyester-based resins; polyurethane-based resins; acrylic polyol urethane-based resins; soluble polyamide-based resins; soluble polyimide-based resins; soluble polyamide imide-based resins; soluble polyester imide-based resins; alkyd resins; aminoalkyd-based resins; epoxy-based resins; chlorinated rubber resins; silicon resins; fluororesins; cellulose acetate-based resins; nitrocellulose-based resins; hydroxyethyl cellulose; water-soluble salts of a styrene-maleic acid ester-based copolymer; water-soluble salts of a (meth) acrylic acid ester-based (co)polymer; water-soluble aminoalkyd-based resins; water-soluble aminopolyester-based resins; and water-soluble polyamide-based resins. These resin binders can be used alone or in combination of two or more.

Examples of the reactive group contained in the reactive resin binder include a methylol group, alkyl methylol groups, an isocyanate group, masked isocyanate groups, and an epoxy group. Moreover, an oligomer or monomer is used depending on the use application, and, further, a crosslinking agent such as, for example, a methylol melamine-based, isocyanate-based, or epoxy-based crosslinking agent is used together.

Specific examples of the energy ray-curable coating film-forming material (photosensitive resin binders) such as an ultraviolet ray-curable resin-based or electron beam-curable resin-based coating film-forming material include photosensitive cyclized rubber-based resins, photosensitive phenol-based resins, photosensitive polyacrylate-based resins, photosensitive polyamide-based resins, and photosensitive polyimide-based resins, and binders such as unsaturated polyester-based resins, polyester acrylate-based resins, polyepoxy acrylate-based resins, polyurethane acrylate-based resins, polyether acrylate-based resins, and polyol acrylate-based resins, and binders obtained by further adding a monomer as a reactive diluent to these binders.

Moreover, in the case where the coloring agent composition according to the present invention is used as a coloring agent for plastics, examples of the plastic that can be an object to be colored include the following plastics. Conventionally known thermoplastic resins such as: polyolefins including polyethylenes, ethylene copolymers, and polypropylenes; polystyrenes; ABS; AS; styrene copolymers; chlorinated vinyl resins; methacrylic resins; polycarbonates; polyamides; polyacetals; thermosetting polyesters; cellulose-based plastics; phenylene oxide resins; fluororesins; thermoplastic elastomers; and thermosetting resins such as unsaturated polyester resins, epoxy resins, silicone resins, polyurethane resins, melamine resins, and phenol resins.

The content of the azo pigment according to the present invention contained in the coloring agent composition according to the present invention is different depending on the use application and the purpose of usage, and is not determined unconditionally. For example, the film thickness is thin in the use application in which coloration is conducted on the surface of an article, such as paints, textile printing agents, printing inks, toners for printers, or inkjet inks, and therefore the content of the azo pigment according to the present invention contained in the coloring agent is about 3% to about 80%, preferably about 5% to about 60%.

Moreover, in the case where inside coloration is conducted on the whole material to be colored, such as coloration of plastics or coloration of spun cotton by undiluted solution, it is preferable that the content of the azo pigment, which is different depending on the thickness of the product to be colored, is about 0.05% to about 20%, more preferably about 0.1% to about 10% in the coloring agent.

EXAMPLES

Hereinafter, the present invention will be described further specifically giving Examples, Comparative Examples, and Use Examples. It is to be noted that "g", "parts", or "%" in Examples is based on mass unless otherwise noted.

Example 1

Synthesis Example of Each Color Pigment

Each color pigment of orange, red, violet, and black pigments of examples according to the present invention was prepared in the manner as described below.

Synthesis Example of Orange Pigment 1

As a diazo component to be used in coupling reaction, 3-(4-aminophenylimino)-1-oxo-4,5,6,7-tetrachloroisoindoline represented by the formula (1) was diazotized in the manner as described below to prepare a solution of a diazonium salt. Specifically, 7.5 g (0.02 mol) of 3-(4-aminophenylimino)-1-oxo-4,5,6,7-tetrachloroisoindoline was dispersed in 188 g of N,N-dimethylacetamide (having a boiling point of 165° C., hereinafter abbreviated as DMAc), 7.4 g of concentrated hydrochloric acid was added thereto, the resultant mixture was stirred for about 1 hour while holding the temperature at 5 to 10° C. to prepare a hydrochloric acid salt, 4.0 g of 40% sodium nitrate aqueous solution was added thereto, and the resultant mixture was stirred for about 1 hour at the same temperature to prepare a yellow solution of the diazonium salt.

On the other hand, 4'-chloro-2',5'-dimethoxyacetoacetanilide being a compound represented by the formula (2) was used as a coupling component, and coupling reaction was conducted in the manner as described below to prepare an azo pigment. First of all, 5.5 g (0.02 mol) of 4'-chloro-2', 5'-dimethoxyacetoacetanilide was dispersed in 80 g of DMAc, 40 g of 30% caustic soda aqueous solution was added thereto to stir the resultant mixture, and the previously prepared solution of the diazonium salt was dropped thereto under stirring at a temperature of 20 to 30° C. Further, coupling reaction was conducted while holding the temperature at 30 to 40° C. for 5 to 6 hours, thereafter the temperature was gradually raised, and heating was conducted at a temperature of 150° C. for 4 hours while removing liquid (removing water) to form a pigment. Subsequently, filtration, washing with methanol, washing with water, drying, and pulverization were conducted to obtain an orange pigment 1 being the azo pigment of an example according to the present invention. The measured decomposition temperature in the air of the obtained orange pigment 1 was 354° C. In addition, the measurement of the decomposition temperature was conducted with a differential thermal balance, Thermo plus EVO 8120 (trade name) manufactured by Rigaku Corporation, in any case.

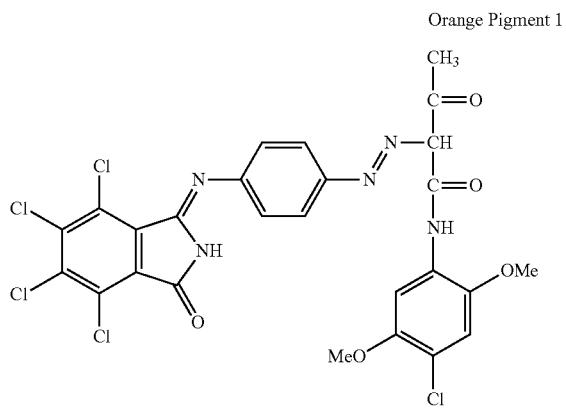 [SMILES: COc1cc(NC(=O)C(/N=N/c2ccc(/N=C3\NC(=O)c4c(Cl)c(Cl)c(Cl)c(Cl)c43)cc2)C(C)=O)c(OC)cc1Cl]

Orange Pigment 1

Synthesis Example of Red Pigment 1

A solution of the diazonium salt of the compound represented by the formula (1) was prepared in the same manner as in the previous Synthesis Example of the orange pigment 1. On the other hand, 4'-ethoxyacetoacetanilide being a compound represented by the formula (2) was used as a coupling component, and coupling reaction was conducted in the manner as described below to prepare an azo pigment. First of all, 4.4 g (0.02 mol) of 4'-ethoxyacetoacetanilide was dispersed in 80 g of DMAc, 40 g of 30% caustic soda aqueous solution was added thereto to stir the resultant mixture, and the previously prepared solution of the diazonium salt was dropped thereto under stirring at a temperature of 20 to 30° C. Further, coupling reaction was conducted while holding the temperature at 30 to 40° C. for 5 to 6 hours, thereafter the temperature was gradually raised, and heating was conducted at a temperature of 150° C. for 4 hours while removing liquid (removing water) to form a pigment. Subsequently, filtration, washing with methanol, washing with water, drying, and pulverization were conducted to obtain a red pigment 1 being the azo pigment of an example according to the present invention. The measured decomposition temperature in the air of the obtained red pigment 1 was as 340° C.

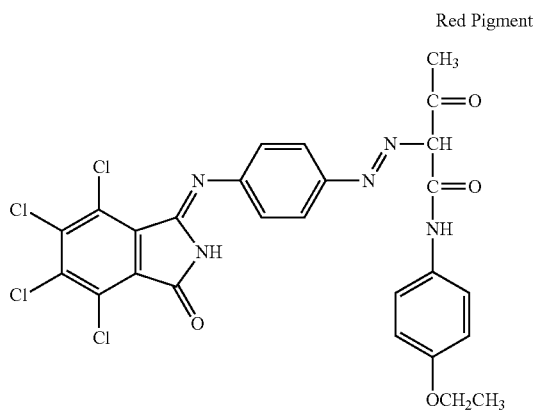

Red Pigment 1

Synthesis Example of Violet Pigment 1

In this example, as a diazo component, 3-(4-aminophenylimino)-1-oxo-4,5,6,7-tetrachloroisoindoline represented by the formula (1) was diazotized in the manner as described below to prepare a solution of a diazonium salt, and the solution of the diazonium salt was used for coupling reaction. Specifically, 7.5 g (0.02 mol) of 3-(4-aminophenylimino)-1-oxo-4,5,6,7-tetrachloroisoindoline was dispersed in 188 g of o-dichlorobenzene (having a boiling point of 180° C., hereinafter abbreviated as ODB), 7.4 g of concentrated hydrochloric acid was added thereto, the resultant mixture was stirred for about 1 hour while holding the temperature at 5 to 10° C. to prepare a hydrochloric acid salt, 4.0 g of 40% sodium nitrate aqueous solution was added thereto, and the resultant mixture was stirred for about 1 hour at the same temperature to prepare a yellow solution of the diazonium salt.

On the other hand, 2-hydroxy-3-naphthoic acid-3'-chloro-4',6'-dimethoxy anilide being a compound represented by the formula (3) was used as a coupling component, and coupling reaction was conducted in the manner as described below to prepare an azo pigment. First of all, 5.5 g (0.02 mol) of 2-hydroxy-3-naphthoic acid-3'-chloro-4',6'-dimethoxy anilide was dispersed in 80 g of ODB, and a solution obtained by dissolving 1.2 g of caustic soda in 40 g of methanol was added thereto to stir the resultant mixture. The solution of the diazonium salt was dropped thereto under stirring at a temperature of 20 to 30° C. Further, coupling reaction was conducted while holding the temperature at 30 to 40° C. for 5 to 6 hours, thereafter the temperature was gradually raised, and heating was conducted at a temperature of 170° C. for 4 hours while removing liquid (removing water) to form a pigment. Subsequently, filtration, washing with methanol, washing with water, drying, and pulverization were conducted to obtain a violet pigment 1 being the azo pigment of an example according to the present invention. The measured decomposition temperature in the air of the obtained violet pigment 1 was 344° C.

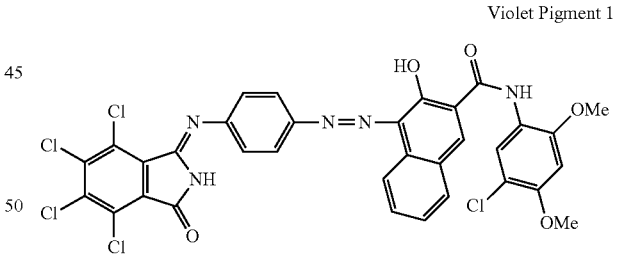

Violet Pigment 1

Synthesis Example of Black Pigment 1

A solution of a diazonium salt was prepared by diazotizing the compound represented by the formula (1) in the same manner as in the Synthesis Example of the violet pigment 1 described previously. On the other hand, N-(2-methyl-4-methoxyphenyl)-2-hydroxy-11H-benzo[a]carbazole-3-carbamide being a compound represented by the formula (4) was used as a coupling component, and coupling reaction was conducted in the manner as described below to prepare an azo pigment. First of all, 5.5 g (0.02 mol) of N-(2-methyl-4-methoxyphenyl)-2-hydroxy-11H-benzo[a]carbazole-3-carbamide was dispersed in 80 g of ODB, a solution obtained by dissolving 1.2 g of caustic soda in 40 g of methanol was added thereto to stir the resultant mixture, and the previously prepared solution of the diazonium salt was dropped thereto under stirring at a temperature of 20 to 30° C. Further, coupling reaction was conducted while holding the temperature at 30 to 40° C. for 5 to 6 hours, thereafter the temperature was gradually raised, and heating was conducted at a temperature of 170° C. for 4 hours while removing liquid (removing water) to form a pigment. Subsequently, filtration, washing with methanol, washing with water, drying, and pulverization were conducted to obtain a black pigment 1 being the azo pigment of an example according to the present invention. The measured decomposition temperature in the air of the obtained black pigment 1 was 347° C.

Black Pigment 1

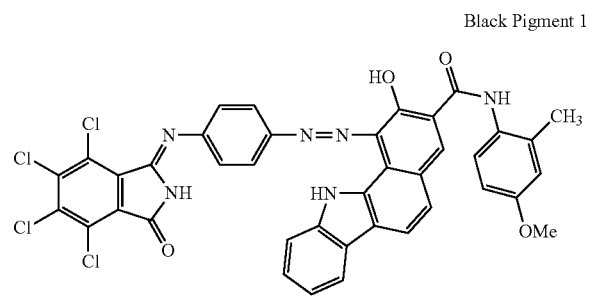 [SMILES: COc1ccc(NC(=O)c2cc3ccc4c5ccccc5[nH]c4c3c(N=Nc3ccc(/N=C4\NC(=O)c5c(Cl)c(Cl)c(Cl)c(Cl)c54)cc3)c2O)c(C)c1]

Comparative Example 1—Production Examples of Orange Pigment 2 and Black Pigment 2

Comparative Synthesis Example of Orange Pigment 2

A diazo component to be used for coupling reaction was prepared in the manner as described below. 7.5 g (0.02 mol) of 3-(4-aminophenylimino)-1-oxo-4,5,6,7-tetrachloroisoindoline represented by the formula (1) was dispersed in 188 g of water, 7.4 g of concentrated hydrochloric acid was added thereto, the resultant mixture was stirred for about 1 hour while holding the temperature at 5 to 10° C. to prepare a hydrochloric acid salt, 4.0 g of 40% sodium nitrate aqueous solution was added thereto, and the resultant mixture was stirred for about 1 hour at the same temperature to prepare a yellow solution of the diazonium salt.

On the other hand, 4-chloro-2',5'-dimethoxyacetoacetanilide being a compound represented by the formula (2) was used as a coupling component, and coupling reaction was conducted in the manner as described below to prepare an azo pigment. First of all, 5.5 g (0.02 mol) of 4-chloro-2',5'-dimethoxyacetoacetanilide was dispersed in 80 g of water, 40 g of 30% caustic soda aqueous solution was added thereto to stir the resultant mixture, and the previously prepared solution of the diazonium salt was dropped thereto under stirring at a temperature of 20 to 30° C. Further, coupling reaction was conducted while holding the temperature at 30 to 40° C. for 5 to 6 hours, thereafter the temperature was gradually raised, and heating was conducted at a temperature of 95° C. for 4 hours to form a pigment. Subsequently, filtration, washing with water, drying, and pulverization were conducted to obtain an orange pigment 2 being the azo pigment of a comparative example according to the present invention. The measured decomposition temperature in the air of the obtained orange pigment 2 was 345° C.

Comparative Synthesis Example of Black Pigment 2

In this example, as a diazo component, 3-(4-aminophenylimino)-1-oxo-4,5,6,7-tetrachloroisoindoline represented by the formula (1) was diazotized in the manner as described below to prepare a solution of a diazonium salt, and the solution of the diazonium salt was used for coupling reaction. Specifically, 7.5 g (0.02 mol) of 3-(4-aminophenylimino)-1-oxo-4,5,6,7-tetrachloroisoindoline was dispersed in 188 g of methanol (having a boiling point of 64.7° C.), 7.4 g of concentrated hydrochloric acid was added thereto, the resultant mixture was stirred for about 1 hour while holding the temperature at 5 to 10° C. to prepare a hydrochloric acid salt, 4.0 g of 40% sodium nitrate aqueous solution was added thereto, and the resultant mixture was stirred for about 1 hour at the same temperature to prepare a yellow solution of the diazonium salt.

On the other hand, N-(2-methyl-4-methoxyphenyl)-2-hydroxy-11H-benzo[a]carbazole-3-carbamide being a compound represented by the formula (4) was used as a coupling component, and coupling reaction was conducted in the manner as described below to prepare an azo pigment. First of all, 5.5 g (0.02 mol) of N-(2-methyl-4-methoxyphenyl)-2-hydroxy-11H-benzo[a]carbazole-3-carbamide was dispersed in 80 g of methanol, a solution obtained by dissolving 1.2 g of caustic soda in 40 g of methanol was added thereto to stir the resultant mixture, and the previously prepared solution of the diazonium salt was dropped thereto under stirring at a temperature of 20 to 30° C. Further, coupling reaction was conducted while holding the temperature at 30 to 40° C. for 5 to 6 hours, thereafter the temperature was gradually raised, and heating was conducted at a temperature of 65° C. for 4 hours while removing liquid (removing water) to form a pigment. Subsequently, filtration, washing with methanol, washing with water, drying, and pulverization were conducted to obtain a black pigment 2 being the azo pigment of a comparative example according to the present invention. The measured decomposition temperature in the air of the obtained black pigment 2 was 343° C.

Example 2—Production Examples of Paint Using Each Color Pigment of Example 1 and Preparation of Samples for Evaluating Paints Preparation of Paint Containing Orange Pigment 1 and Preparation of Colored Paper Painted with the Paint An orange paint was prepared using the orange pigment 1 obtained in Example 1 by the formulation as described below. Specifically, 1.5 parts of the orange pigment 1, 15.5 parts of a melamine alkyd resin varnish, 3 parts of a thinner, and 25 parts of glass beads were placed in a plastic bottle, the resultant mixture was shaken with a paint shaker for 90 minutes, and thereafter 10 parts of the melamine alkyd resin was further added to shake the resultant mixture for further 10 minutes with the paint shaker to prepare a thermosetting alkyd paint. The melamine alkyd resin varnish used in the formulation consists of 30% of Super Beckamine J-820 (trade name, manufactured by DIC Corporation) and 70% of Phthalkyd 133-60 (manufactured by Hitachi Chemical Co., Ltd.), and the resin content of the prepared varnish is 60%. Accordingly, the azo pigment is contained about 10 parts relative to 100 parts of the solid content of the melamine alkyd resin. The thinner used in the formulation consists of 80% of xylene and 20% of 1-butanol.

The orange paint containing the orange pigment 1 and prepared above was applied on white paper with black stripes printed thereon using a 10-mill applicator and dried (baked) according to a normal method. The film thickness after drying was about 485 nm. Hereinafter, the resultant paper is referred to as orange-colored paper.

(Preparation of Paint Containing Each of Red Pigment 1, Violet Pigment 1, and Black Pigment 1 and Preparation of Colored Paper Painted with Each Paint)

A red paint and red-colored paper were obtained in the same manner as described previously except that the orange pigment 1 used for preparing the paint described previously was changed to the red pigment 1 obtained in Example 1. Similarly, a violet paint and violet-colored paper, and a black paint and black-colored paper were obtained in the same manner as described previously except that the orange pigment 1 was changed to the violet pigment 1 obtained in Example 1 and the black pigment 1 respectively.

Comparative Example 2—Production Examples of Paint Using Each of Orange Pigment 2 and Black Pigment 2 and Preparation of Samples for Evaluating Paints A comparative orange paint was prepared in the same manner as described previously except that the orange pigment 1 used for preparing the paint described previously was changed to the orange pigment 2 obtained in Comparative Example 1. Moreover, comparative orange-colored paper was prepared using the comparative orange paint. However, the viscosity of the obtained comparative orange paint was a little higher as compared with the viscosity of the orange paint of Example 2. Similarly, a comparative black paint was prepared in the same manner as described previously except that the orange pigment 1 was changed to the black pigment 2 obtained in Comparative Example 1. Moreover, comparative black-colored paper was prepared using the comparative black paint. However, the viscosity of the obtained comparative black paint was considerably higher as compared with the viscosity of the black paint of Example 2. It is considered that this is because pigment formation is not conducted especially in the case of the black pigment 2 and the pigment particles are considerably high.

(Evaluation Results 1—Color Measurement)

Color measurement was conducted for each colored paper prepared in Example 2 and Comparative Example 2 in the manner as described above with a spectrophotometer CM-3600d (trade name, manufactured by Konica Minolta, Inc., SCE (Specular Component Excluded) type, standard illuminant D65, and 10° viewing angle). The results are shown together in Table 1.

TABLE 1

Comparison of tone of color for colored paper obtained by using each color paint of Example 2 and Comparative Example 2

| Paint | Colored paper | L* | a* | b* |
|---|---|---|---|---|
| Orange paint | Orange-colored paper | 45.38 | 59.49 | 45.34 |
| Red paint | Red-colored paper | 36.76 | 54.61 | 35.15 |
| Violet paint | Violet-colored paper | 17.45 | 7.25 | 3.53 |
| Black paint | Black-colored paper | 14.95 | 0.90 | −0.53 |
| Comparative orange paint | Comparative orange-colored paper | 40.87 | 60.45 | 50.36 |
| Comparative black paint | Comparative black-colored paper | 13.18 | 1.14 | −0.52 |

Example 3—Preparation of Painted Plate for Evaluation Using Each Color Paint Prepared in Example 2 and Evaluation Results 2 (Measurement Results of Reflectance and Transmittance)

Each color paint prepared in Example 2 described previously was used and applied on a transparent quartz glass plate with a 6-mill applicator, and was dried according to a normal method. The film thickness after drying was about 320 nm in any case. The reflectance and transmittance in a visible region and a near infrared region were measured with a 330 type automatic recording spectrophotometer (manufactured by Hitachi, Ltd.) for each painted plate containing a transparent base plate thus obtained using each color paint. In measuring the reflectance and transmittance, measurement was conducted for each of the case where a substrate was white and the case where the substrate was black in the manner as described below. Specifically, in the case where the substrate was white, the measurement was conducted by bringing a white plate (magnesium oxide plate) into contact with the back face of each glass plate, and, in the case where the substrate was black, the measurement was conducted by bringing a black plate (carbon black plate) into contact with the back face of each glass plate. And, measurement results of the maximum reflectance wavelengths and the reflectance at each wavelength in the case where the substrate was black are shown in Tables 2 and 3. Moreover, the measurement results of transmittance are shown in Table 4.

Comparative Example 3—Preparation of Painted Plate for Evaluation Using Each of Comparative Orange Paint and Comparative Black Paint Obtained in Comparative Example 2 and Evaluation Results 2 (Measurement Results of Reflectance and Transmittance)

Evaluation was conducted in the same manner as in Example 3, and the results are shown together in Tables 2 to 4.

TABLE 2

Maximum reflectance wavelength and maximum reflectance for each color painted plate of Example 3 and Comparative Example 3

| Paint | Painted plate | Maximum reflectance (%) | Maximum reflectance wavelength (nm) |
|---|---|---|---|
| Orange paint | Orange painted plate | 44.0 | 625 |
| Red paint | Red painted plate | 59.1 | 650 |
| Violet paint | Violet painted plate | 38.9 | 750 |
| Black paint | Black painted plate | 42.1 | 840 |
| Comparative orange paint | Comparative orange painted plate | 29.0 | 625 |
| Comparative black paint | Comparative black painted plate | 18.5 | 840 |

TABLE 3

Reflectance for each color painted plate of Example 3 and Comparative Example 3 (black substrate)

| Wavelength (nm) | Reflectance (%) | | | | | |
|---|---|---|---|---|---|---|
| | Orange painted plate | | Red painted plate | Violet painted plate | Black painted plate | |
| | Example 3 | Comparative Example 3 | Example 3 | Example 3 | Example 3 | Comparative Example 3 |
| 600 | 43 | 20 | 36 | 1 | 0 | 0 |
| 700 | 36 | 26 | 56 | 32 | 2 | 1 |
| 800 | 28 | 20 | 49 | 35 | 47 | 12 |
| 900 | 22 | 16 | 44 | 28 | 43 | 16 |
| 1000 | 17 | 14 | 38 | 23 | 37 | 14 |
| 1100 | 14 | 11 | 34 | 18 | 33 | 12 |
| 1200 | 11 | 9 | 31 | 15 | 29 | 10 |
| 1300 | 9 | 7 | 28 | 13 | 26 | 9 |
| 1400 | 7 | 5 | 25 | 11 | 23 | 8 |
| 1500 | 6 | 4 | 22 | 9 | 20 | 6 |

TABLE 4

Transmittance (%) for each color painted plate of Example 3 and Comparative Example 3

| Wavelength (nm) | Transmittance (%) | | | | | |
|---|---|---|---|---|---|---|
| | Orange painted plate | | Red painted plate | Violet painted plate | Black painted plate | |
| | Example 3 | Comparative Example 3 | Example 3 | Example 3 | Example 3 | Comparative Example 3 |
| 600 | 13 | 33 | 10 | 1 | 0 | 0 |
| 700 | 45 | 55 | 31 | 32 | 1 | 0 |
| 800 | 55 | 63 | 36 | 45 | 22 | 30 |
| 900 | 62 | 68 | 40 | 52 | 30 | 60 |
| 1000 | 68 | 71 | 44 | 59 | 36 | 68 |
| 1100 | 73 | 76 | 48 | 64 | 40 | 73 |
| 1200 | 76 | 78 | 52 | 68 | 44 | 76 |
| 1300 | 78 | 80 | 55 | 72 | 46 | 78 |
| 1400 | 81 | 83 | 60 | 74 | 48 | 78 |
| 1500 | 84 | 86 | 64 | 76 | 50 | 82 |

As shown in Table 3, the reflectance is smaller in the case of Comparative Example 3 for each color painted plate, moreover as shown in Table 4, the transmittance is larger in the case of Comparative Example 3 as compared with the transmittance in the case of Example 3 for each color painted plate, and the reason is as follows. In Example 3 and Comparative Example 3, the orange paint and the comparative orange paint prepared in Example 2 and Comparative Example 2 respectively are used, the black paint and the comparative black paint prepared in Example 2 and Comparative Example 2 respectively are used, moreover in the orange paint and the comparative orange paint and in the black paint and the comparative black paint, the pigment of the same color has the same diazo coupling component and coupling component, and therefore the pigment of the same color has the same chemical structure. It is to be noted here that, in the case of pigments having the same chemical structure, the transmittance of a pigment becomes higher and the reflectance of the pigment becomes lower as the particle of the pigment is finer. From this fact, it is considered that, in the pigments used for painted plates of Comparative Example 3, favorable pigment formation, which was conducted with the solvent having a boiling point of 120° C. or higher in Examples, was not conducted because of the solvent being different from the solvent in Examples, therefore growth (crystallization) of the primary particles into a favorable state and control of the particles was not be able to be completed simultaneously resulting in smaller particle diameters, and, as a result, the reflectance became smaller and the transmittance became larger in the cases of Example 3 as compared with the reflectance and transmittance in the cases of the Comparative Example 3. As shown in the cases of Comparative Example 3, when the favorable crystallization is not achieved resulting in smaller pigment particle diameters and uncontrolled pigment particles, the pigment becomes inferior to practicability because of poor fluidity in the case where, for example, a pigment dispersion such as a paint is prepared.

Example 4—Preparation of Red Printing Paste Using Red Pigment 1 Prepared in Example 1, Preparation of Printed Cloth for Evaluation Using Red Printing Paste, and Evaluation Results 3 (Heat Ray-Shielding Property)

After 71 parts of press cake containing 25 parts in terms of a solid content of the red pigment 1 obtained in Example 1, 10 parts of a nonionic pigment dispersant, 1 part of a defoaming agent, and 18 parts of water were sufficiently premixed, the pigment was dispersed with a horizontal type continuous medium disperser using a glass bead as a dispersion medium to prepare a high-concentration dispersion liquid (red color base) containing a red pigment. An oil-in-water type red emulsion paste was prepared by emulsifying and dispersing 20 parts of the red color base thus obtained, 25 parts of a reactive acrylic acid alkyl ester latex (having a solid content of 40%), 0.5 parts of a defoaming agent, 1 part of a dispersant, 3 parts of an oil-in-water type dispersion stabilizer for emulsification, 38 parts of mineral turpentine, and 12.5 parts of water with a homogenizer (strong emulsifying disperser). Further, 2 parts of a carbodiimide-based crosslinking agent (having a solid content of 40%) was added thereto, and the resultant mixture was sufficiently mixed to prepare a red printing paste. The whole surface of polyester-cotton blended cloth was printed using the obtained red printing paste and cured at 120° C. for 15 minutes to obtain red plain printed cloth. It was confirmed that the obtained red plain printed cloth was able to shied heat rays.

Example 5—Preparation of Black Gravure Printing Ink Using Black Pigment 1 Prepared in Example 1, Preparation of Printed Matter for Evaluation Using Black Gravure Printing Ink, and Evaluation Results 4 (Visible Light-Shielding Property/Infrared Transparency)

11 parts of the black pigment 1 obtained in Example 1, 30 parts of a 40% solution of a polyurethane resin, which has an isocyanate terminal polyester the chain length of which is extended by a diamine, dissolved in a mixed solvent of methyl ethyl ketone/toluene (1:3), 2 parts of a cationic polymer dispersant, 2.5 parts of a 40% solution of a polycarbodiimide compound, which is derived from tolylene diisocyanate, dissolved in toluene, and 54.5 parts of a mixed solvent of methyl ethyl ketone/toluene/isopropyl alcohol (50:30:20) were sufficiently mixed with a high-speed mixer. And the pigment was dispersed with a horizontal type continuous media disperser using a glass bead as a dispersion medium to prepare a black gravure printing ink. Printing was conducted on a polyamide film, a polyester film, and a polypropylene film with a gravure printing machine to obtain black films each having each material film as a base material. It was confirmed that any of the black films was able to shield visible light and transmit infrared rays.

The invention claimed is:
1. A crystalized near infrared-reflecting/transmitting azo pigment exhibiting a near infrared-reflecting/transmitting property, comprising
a crystalized azo pigment having a single maximum reflectance wavelength in a wavelength region from 600 to 900 nm in a reflectance spectrum measured on a black substrate in a wavelength region from 500 to 1500 nm,
wherein the crystalized azo pigment is obtained by coupling a diazo component, which comprises a diazonium salt, which is a salt of a diazonium compound represented by formula (1) below, with a coupling component represented by formula (4) below:

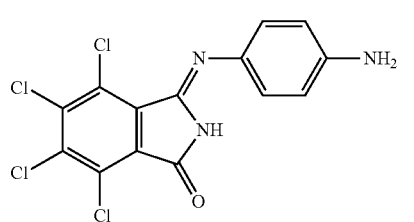

(1)

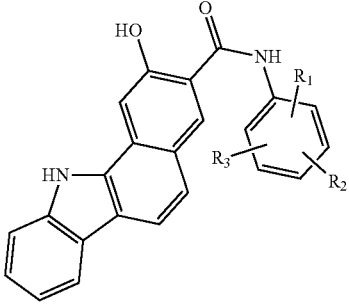

(4)

wherein $R_1$, $R_2$, and $R_3$ in the formula (4) are independently selected from the group consisting of a hydrogen atom, a halogen atom, a methyl group, a methoxy group, an ethoxy group, and an acetylamino group,
the crystalized azo pigment is formed by a process comprising: (i) preparing the diazonium component comprising the diazonium salt by using an organic solvent having a boiling point of 120° C. or higher; (ii) synthesizing an azo pigment by a coupling reaction between the diazonium component and the compound represented by the formula (4) in the organic solvent having a boiling point of 120° C. or higher; and (iii) subjecting the synthesized azo pigment to pigmentation by crystalizing the azo pigment in the organic solvent having a boiling point of 120° C. or higher, and
an L* value in a CIE LAB (L*a*b*) color system is in a range of 10 or more when color measurement of a paint applied on white paper with a 10-mill applicator is conducted with a spectrophotometer, wherein the paint is prepared by adding the crystalized azo pigment in an amount of 10 parts by mass relative to 100 parts by mass of a solid content of a melamine alkyd resin, and dispersing the azo pigment in the melamine alkyd resin.
2. A process for producing the crystalized near infrared-reflecting/transmitting azo pigment according to claim 1, the process comprising:
a step of dispersing 3-(4-aminophenylimino)-1-oxo-4,5,6,7-tetrachloroisoindoline represented by the formula (1) in the organic solvent having a boiling point of 120° C. or higher, then preparing a hydrochloric acid salt with concentrated hydrochloric acid, and diazotizing the hydrochloric acid salt with a nitrite dissolved in water to prepare the diazonium salt, thereby preparing the diazonium component;
a step of using the compound represented by the formula (4) as the coupling component, and dropping a solution of the diazonium salt prepared in the above step into an organic solvent solution obtained by dispersing the coupling component in the organic solvent having a boiling point of 120° C. or higher and conducting the coupling reaction, and thereby synthesizing the azo pigment; and
a step of subsequently heating the organic solvent containing the synthesized azo pigment at a temperature in a range from 120° C. to 200° C., while removing a liquid component having a boiling point of 120° C. or lower from the organic solvent containing the synthesized azo pigment by distilling, thereby subjecting the azo pigment to the pigmentation by crystalizing the azo pigment in the organic solvent having a boiling point of 120° C. or higher.

3. The process for producing the crystalized near infrared-reflecting/transmitting azo pigment according to claim 2, wherein the organic solvent having a boiling point of 120° C. or higher is at least one solvent selected from the group consisting of chlorobenzene, o-dichlorobenzene, ethyl cellosolve, butyl cellosolve, nitrobenzene, o-nitrotoluene, N—N-dimethylformamide, N—N-di methylacetamide, N-methyl-2-pyrrolidone, and 1,3-dimethyl-2-imidazolidinonedimethyl.

4. A coloring agent composition in a liquid or solid form, comprising a pigment component in a liquid dispersion medium or in a solid dispersion medium,
wherein the pigment component is the crystalized near infrared-reflecting/transmitting azo pigment according to claim 1 or a crystalized near infrared-reflecting/transmitting azo pigment formed by a process comprising:
a step of dispersing 3-(4-aminophenylimino)-1-oxo-4,5,6,7-tetrachloroisoindoline represented by the formula (1) in an organic solvent having a boiling point of 120° C. or higher, then preparing a hydrochloric acid salt with concentrated hydrochloric acid, and diazotizing the hydrochloric acid salt with a nitrite dissolved in water to prepare a diazonium salt, thereby preparing a diazonium component;
a step of using the compound represented by the formula (4) as a coupling component, and dropping a solution of the diazonium salt prepared in the above step into an organic solvent solution obtained by dispersing the coupling component in the organic solvent having a boiling point of 120° C. or higher and conducting a coupling reaction, and thereby synthesizing an synthesized azo pigment; and
a step of subsequently heating the organic solvent containing the synthesized azo pigment at a temperature in a range from 120° C. to 200° C., while removing a liquid component having a boiling point of 120° C. or lower from the organic solvent containing the synthesized azo pigment, thereby subjecting the azo pigment to pigmentation by crystallizing the azo pigment in the organic solvent having a boiling point of 120° C. or higher.

5. The coloring agent composition according to claim 4, wherein the liquid dispersion medium comprises a film-forming component,
the film-forming component is at least one material selected from the group consisting of polymers having or not having a reactive group, oligomers having or not having a reactive group, and monomers having or not having a reactive group, and the film-forming component itself is in a liquid form or comprises a solvent or water or a mixture thereof so as to be in a liquid form.

6. The coloring agent composition according to claim 4, wherein the solid dispersion medium is a dispersion medium in a solid form, and
the solid dispersion medium comprises at least one medium selected from the group consisting of solid dispersion media made of a thermoplastic resin, solid dispersion media made of a thermosetting resin, waxes, fatty acid amides, and metal soaps of a fatty acid.

7. The coloring agent composition according to claim 4, wherein the coloring agent composition is present in at least one material selected from the group consisting of paints, plastics, synthetic fibers, printing inks, and writing materials, or
the coloring agent composition colors image recording or image displaying.

8. A coloring method for coloring an article having a transparent base material with the coloring agent composition according to claim 7,
wherein a surface of the transparent base material is colored with the coloring agent composition by at least one method selected from the group consisting of paint application, dying, printing, writing, drawing, inkjet printing, electrophotographic printing, and electrostatic printing, or
an inside of the article is colored by a method of kneading the coloring agent composition with a material forming the coloring agent composition or impregnating the coloring agent composition into a material forming the coloring agent composition.

9. A colored article colored by the method for coloring an article according to claim 8.

10. The crystalized near infrared-reflecting/transmitting azo pigment accordingly to claim 1,
wherein the crystalized near infrared-reflecting/transmitting azo pigment has higher reflectance and lower transmittance in a wavelength range from 600-1500 nm, compared with reflectance and lower transmittance in the same wavelength of a near infrared-reflecting/transmitting azo pigment that is not formed by being subjected to the pigmentation, where the reflectance and the transmittance are measured with the crystalized azo pigment or the azo pigment that is not subjected to the pigmentation is in a paint form comprising the crystalized azo pigment or the azo pigment that is not subjected to the pigmentation in an amount of 1.5 parts by mass relative to 25.5 parts by mass of a melamine alkyd resin and have a thickness of about 320 nm.

* * * * *